US005810290A

United States Patent [19]

Merensky et al.

[11] Patent Number: 5,810,290

[45] Date of Patent: Sep. 22, 1998

[54] VEHICLE SEATING ROWS, PARTICULARLY AIRPLANE PASSENGER SEATING ROWS

[75] Inventors: Harald Merensky, Hamburg; Paul Bäumlisberger, Westheim Rosengarten; Gerhard Klein, Schwäb.Hall/Hessental; Peter Miehlke, Mainhardt/Bubenorbis; Frank-Heinrich Schönenberg, Schwäb.Hall/Sulzdorf, all of Germany

[73] Assignee: Keiper Recaro GmbH & Co., Remscheid, Germany

[21] Appl. No.: 660,234

[22] Filed: Jun. 7, 1996

[30] Foreign Application Priority Data

Jun. 7, 1995 [DE] Germany ........................ 195 20 794.7

[51] Int. Cl.$^{6}$ ...................................................... B64D 11/06

[52] U.S. Cl. .................................... 244/118.6; 244/122 R; 247/232; 296/65.1

[58] Field of Search ............................. 244/118.6, 122 R; 297/232, 233, 452.4; 248/346.07, 366.03, 172; 296/65.1

[56] References Cited

U.S. PATENT DOCUMENTS 4,881,702 11/1989 Slettebak .
5,464,273 11/1995 Makoto .
5,509,722 4/1996 Beroth .
5,553,813 9/1996 Merensky .
5,558,309 9/1996 Marechal .
5,597,139 1/1997 Beroth .

FOREIGN PATENT DOCUMENTS 43 37 938 C1 of 1995 Germany .

*Primary Examiner*—Robert J. Oberleitner
*Assistant Examiner*—Tien Dinh
*Attorney, Agent, or Firm*—Wigman, Cohen, Leitner & Myers, P.C.

[57] ABSTRACT

An improved vehicle seating row, in particular an airplane passenger seating row. The seating row is provided with at least one seat which can be displaced in the direction of the cross struts of a framework relative to the neighboring seat between two positions in which the seat row has a maximum or a minimum width and which can be locked in these positions to the framework by means of a latching mechanism, and with a hand lever mounted at one of the two end seat dividers which can be moved to three different tilted positions for actuating of the latching mechanism as well as a manually releasable locking device for the hand lever. The center position of the hand lever is associated with the released state of the latching mechanism and the two other tilted positions are associated with the effective state of the latching mechanism for the installation of the seating row with minimum or maximum widths, respectively.

12 Claims, 6 Drawing Sheets

VEHICLE SEATING ROWS, PARTICULARLY AIRPLANE PASSENGER SEATING ROWS

FIELD OF THE INVENTION

The invention pertains to a vehicle seating row, particularly an airplane seating row.

BACKGROUND OF THE INVENTION

In a known airplane seating row (DE 43 37 938 C1), a grooved roll is turned by means of a hand lever and pegs engage with the grooves which connect to one end of Bowden cables. These cables activate the latching mechanism for the parts which move in the direction of the cross struts and also activate the coupling device. With these components, the two side portions of the seat back of the middle seat can be connected to its middle section or to the seat backs of the two outer seats. To retrofit from three seats of normal width to two seats of enlarged width, the hand lever must first be tilted from the middle position to the end position so that the latching mechanism is released, which is a prerequisite for changing the width of the seating row. As soon as the minimal width is reached the hand lever can be tilted to the other end position which activates the coupling device. If the seating row consisting of the enlarged width with two seats is modified to one with three seats of a normal row, the hand lever must first be moved to the center position, then to the other end position and from the other end position to the center position. Before a movement of the hand lever is possible, a pushbutton, which constitutes the actuating member of the locking device, must be activated.

SUMMARY OF THE INVENTION

The objective of creating a vehicle seating row of the type mentioned above with improved, and especially with simplified interchangeability with respect to the number of seats and/or to the separation of the seats from one another is the basis for this invention. This objective is met by a vehicle seating row with the features of the present invention.

The association of the center position of the hand lever to the released state of the latching mechanism simplifies the actuation of the hand lever and thus also the change-out of the seating row, since for each change-out the hand lever only needs to be tilted from one end position through the center position to the other end position.

In a preferred embodiment, the hand lever is coupled to the latching mechanism by means of a toothed-wheel gear. This type of force transfer from the hand lever to the latching mechanism reduces the required force expenditure and reduces the incidence of problems considerably.

Preferably, the latching mechanism has a rail along the outside of one cross strut and rigidly connected to it, and a locking disc which moves along this rail when the width of the seat row is changed. This disc can be moved from one position at which it rests against one end of this rail, across a position in which a notch provided in the disc is aligned with the rail to be used for movement along it, to a position at which it rests against the other end of the rail. The sections of the seating row moveable in the direction of the cross strut can be snugly secured against displacement in this way in simple fashion. As long as there are shoulders provided on the locking disc which cooperate with the rail, it can be ensured in a simple way using the locking disc that the hand lever cannot be tilted across the center position before the displacement of the sections moveable along the cross strut has been made.

If this seating row is of the type which can be changed from two seats of enlarged width to three seats of normal width and which can be reversed, a coupling device can then be coupled by means of gears to the hand lever over a second gear. The two side sections of the seat back of the middle seat can be connected to the middle section or to the seat backs of the two outer seats using this coupling device, as desired. The second toothed-wheel gear reduces the actuation force which must be applied to the hand lever similar to the first toothed-wheel gear. In addition, such a geared coupling is less susceptible to incidence of problems. This second toothed-wheel gear preferably has a wheel with toothed rim extending only over a portion of its perimeter. This toothed rim is designed and arranged such that it does not engage with the toothed wheel associated with it at the center position of the hand lever. In this way, it is easily ensured that during the movement of the sections movable in the direction of the cross strut, no actuation force from the hand lever can be transferred to the coupling device. An arresting device is included with the second toothed-wheel gear for this purpose, which secures this gear against rotation while the toothed rim is not engaged. Such an arresting device can be formed by a click-stop device at one toothed wheel, for example. However, a detent can also be used.

The locking device, which must first be released before the hand lever can be tilted, has a tilt-lever with a preferred design which is arranged in a depression on the outside of the paneling of the end seat divider at which the hand lever is mounted. A latch can be coupled to this tilt-lever which cooperates with a locking disc which is rigidly connected to the hand lever. If the tilt-lever is tilted from the rest position to the release position, this latch is pulled back out of the locking disc. The locking disc can have a cam or something similar, with the latch resting against its two ends at the two end positions of the hand lever.

It is beneficial to spring-load the tilt-lever to return to its rest position, at which the latch engages its locked position. The tilt-lever needs then only to be held in its release position long enough until the hand lever has been tilted to a small angle. The latch then lies on the cam long enough until the tilt-lever is in the other end position and drops into the cam again, whereupon the hand lever is automatically latched and the tilt lever is automatically returned to its initial position.

An indicator element is associated with the tilt-lever which is positioned over the outside of the covering of the seat divider only in the actuated state of the tilt-lever. Such an indicator element, which can have the form of a lug or a knob, for example, then indicates immediately that the sections movable in the direction of the cross strut are not latched.

In these types of seating rows whose middle seat has a sectioned seat-back, it is necessary to place the seat-backs, which are all individually tilt-adjustable, to the same angle before a change-over so that the two side sections of this middle seat-back can be connected to the center section or to the seat-backs of the two outer seats. In a preferred design, all control elements are provided with gas springs which maintain the seat-backs at the desired positions. By simultaneous activation of the control elements, all seat-backs can be automatically tilted to the same, preferably the steepest position. This arrangement of the seat-backs is carried out before the change-over can be initiated, thanks to the activation of the actuation device by means of the tilt-lever.

The invention will be more clearly understood by referring to the following brief description of the drawings, the detailed description of the invention, the appended claims and to the several views illustrated in the drawings.

BRIEF DESCRIPTION OF THE DRAWINGS

FIG. 1A shows the prior art environment of the present invention and is a figure taken from DE 4337938 C1.

DETAILED DESCRIPTION OF THE INVENTION

Figure 5:
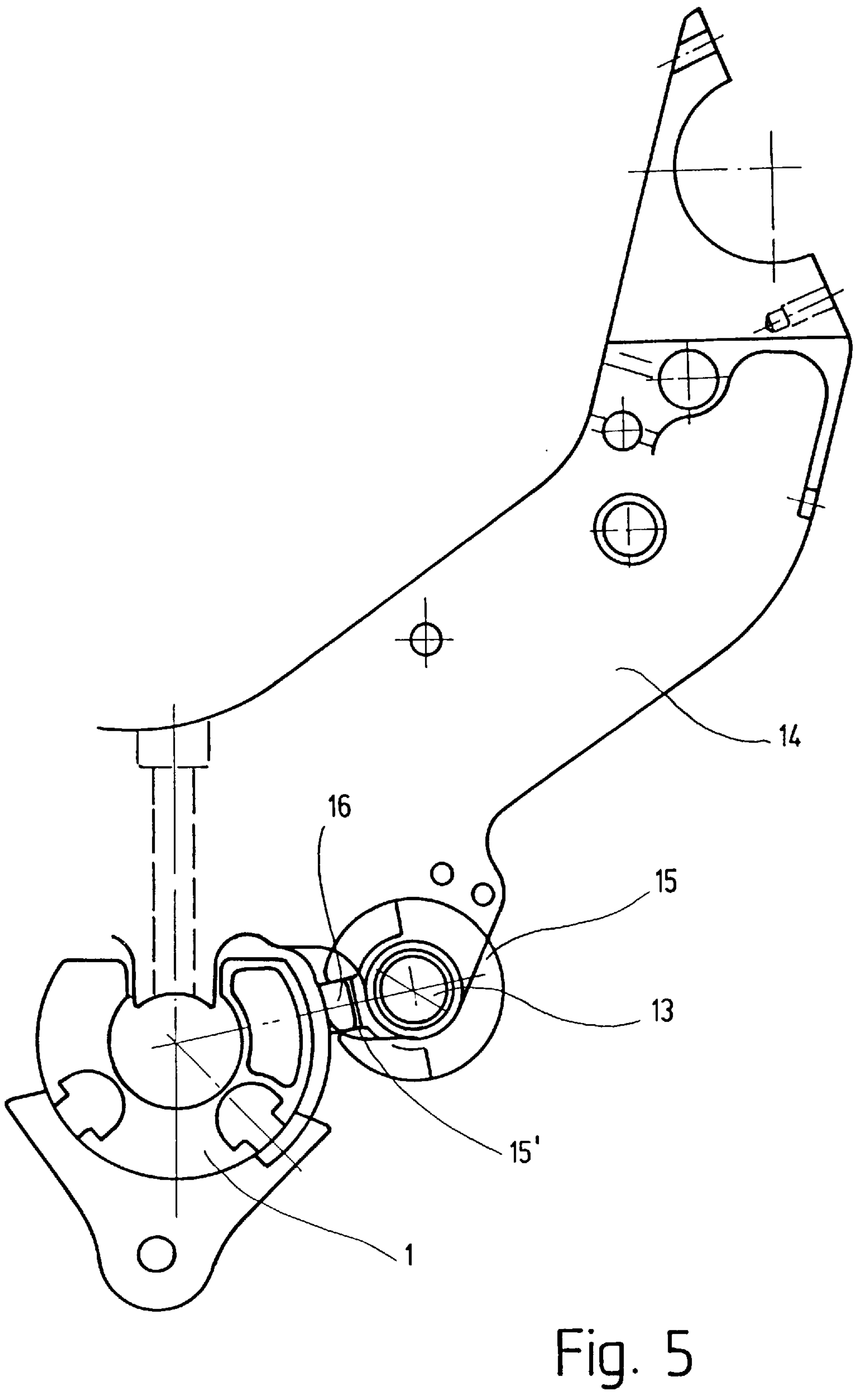
FIG. 5 is a partial view of the seat divider represented to the left in FIG. 2 as well as the locking disc and the rear cross strut.

Referring now to the drawings, wherein like elements are designated by like numerals, an airplane passenger seat is shown, which can be changed-over from two seats of enlarged width to three seats of normal width and can be reversed, has two parallel cross struts, of which only the rear cross strut 1 is shown. Both cross struts are rigidly connected to pedestals. The cross struts carry three seats arranged together, with their seat backs connected tiltably to seat dividers, and extend at an angle from the front to the rear cross strut 1 and, as shown in FIG. 5, out over these struts to the rear and upward up to the connection to the seat back. The seat back of the middle seat is sectioned into three adjacent parts which connect rigidly to the center portion or rigidly to the seat back of one or the other adjacent seat as desired. In the case of a connection to the seat backs of both outer seats, two seats of enlarged width are available. The two side sections of the seat back of the middle seat in this case rest against the middle section of this seat back with no gap and against the seat backs of the two outer seats. The seating row has its minimum width in this installation, measured along the cross struts. If, in contrast, the two side sections of the seat back of the middle seat are connected to the middle section in order to provide three seats of normal width, a gap then exists between each seat back. The seat row has its maximum width with this installation.

Figure 1:
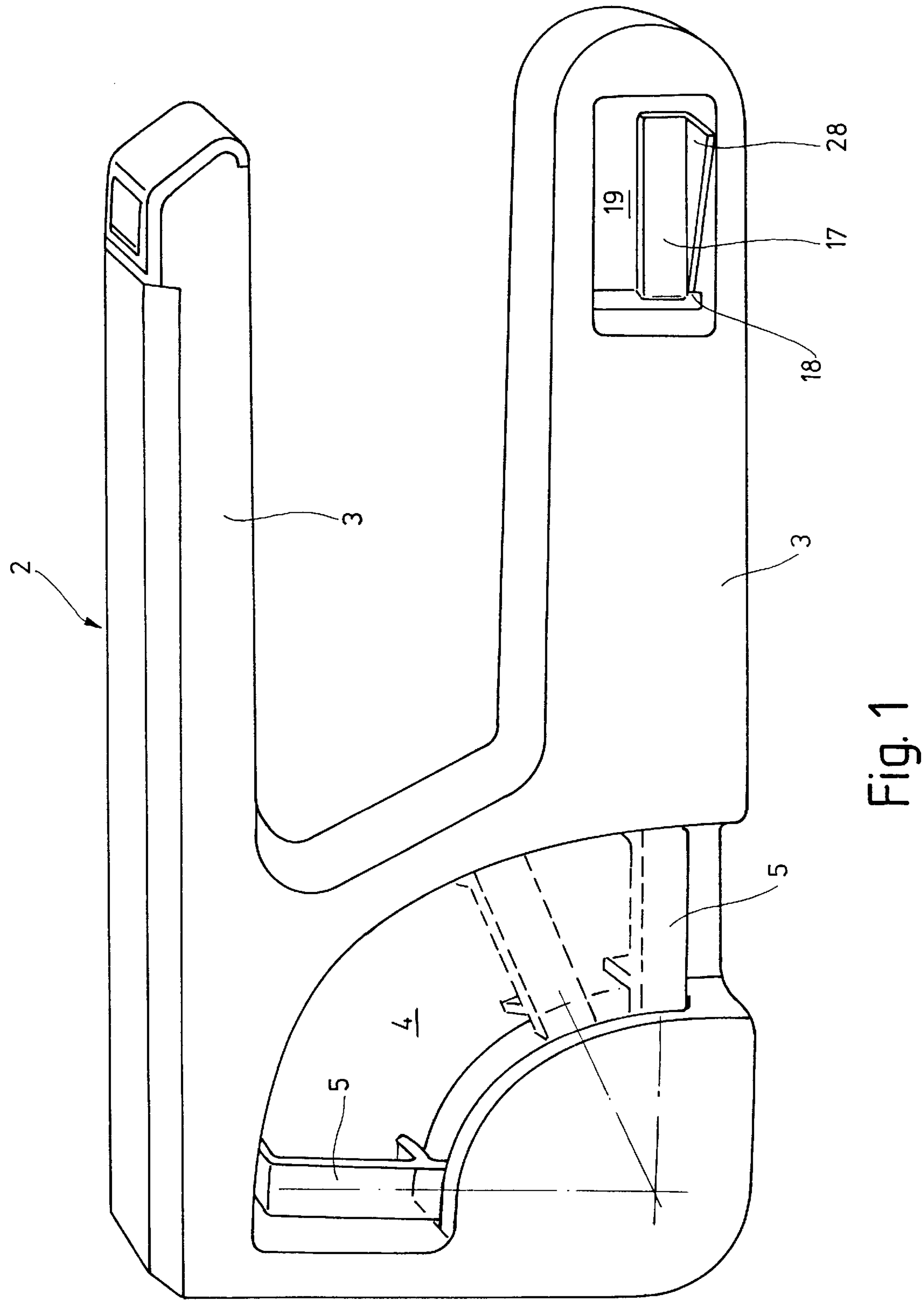
FIG. 1 is a side view of the seat divider of the airplane passenger seating row, covered with a paneling, containing the hand lever and the tilt-lever.
Figure 1A:
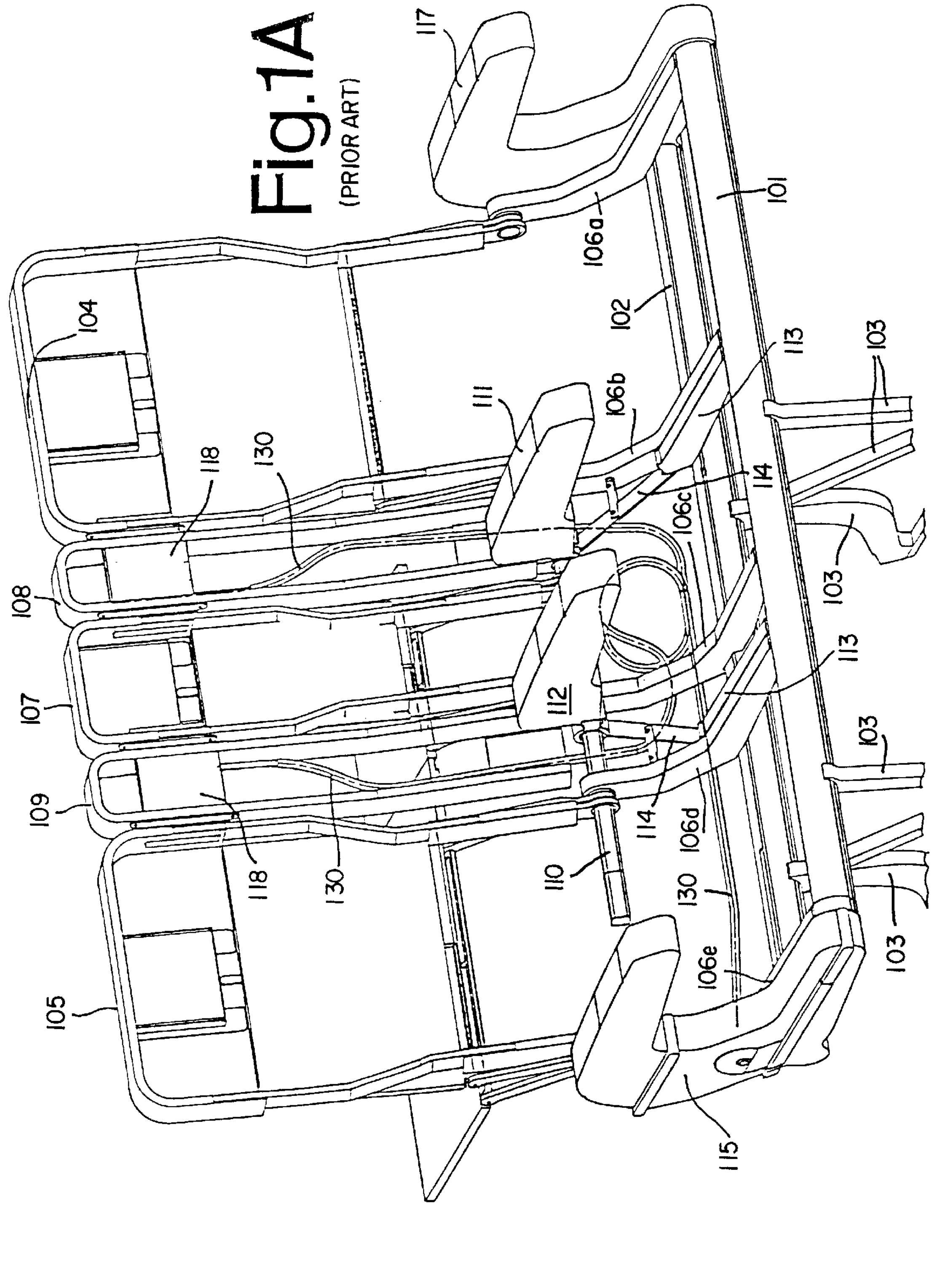
FIG. 1A is perspective of a prior art airline passenger seating row.

The change-over of the seat row from two seats of enlarged width to three seats of normal width is done from one accessible end of the seating row. A seat divider 2 provided at this end of the seating row has, as shown in FIG. 1, a circular, notched depression 4 extending over approximately 90° in its paneling 3 at the rear section for a hand lever 5, which is attached rigidly to a shaft 6 parallel to the rear cross strut 1. The shaft 6 is mounted rotatably in the seat divider 2.

Figure 4:
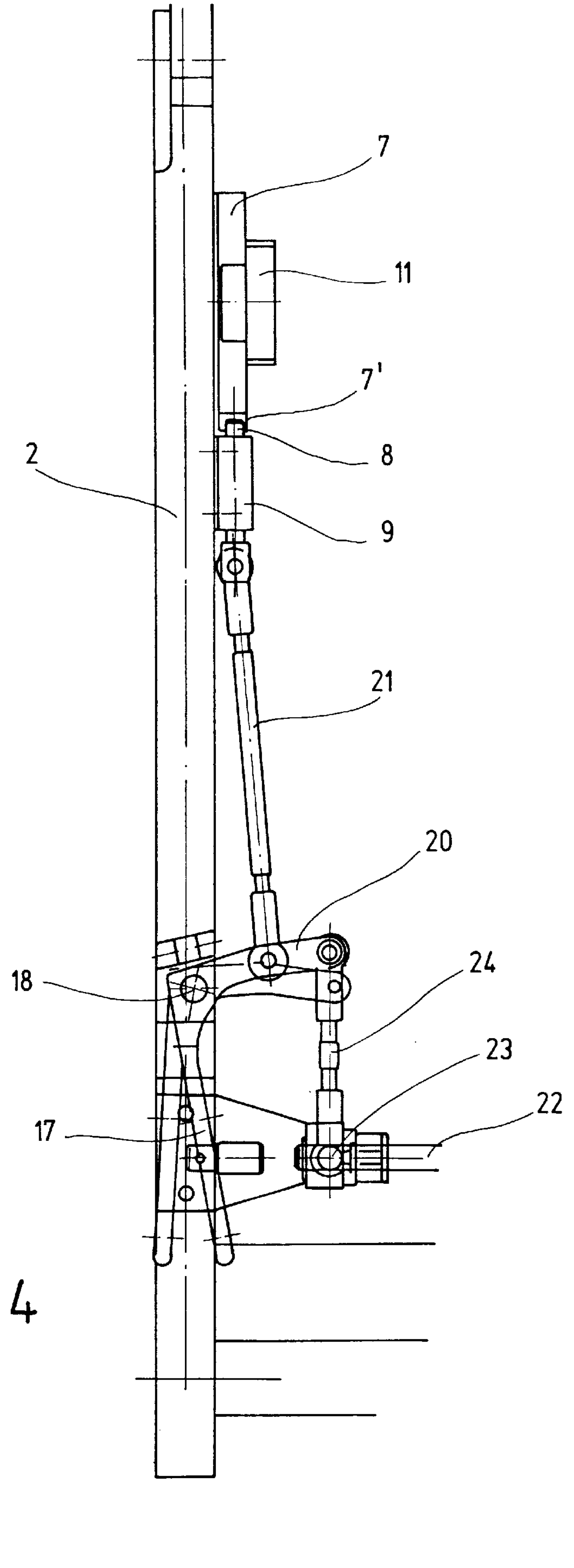
FIG. 4 is a partial view from above of the seat divider represented in FIG. 1 without paneling, but with the installed tilt-lever and the sections actuated by it.

A locking disc 7 is located on the shaft 6 directly against the inside of the seat divider 2, and in this embodiment has a cam 7', 15 (FIG. 4) of constant height on a portion of its perimeter. A locking stem 8 is directed at the center of the locking disc 7, as shown in FIG. 4 as well, which is guided axially in a guideway 9 fixed to the seat divider 2 and which rests against one or the other end of the cam 7' when in its locked position. In this way, the hand lever 5 cannot be moved from its two end positions, at which it assumes a horizontal or a vertical position, respectively, if the locking stem 8 is not withdrawn, thereby releasing the cam 7'.

In order to limit the turning moment of the hand lever 5 transferred to the shaft 6, and thereby to prevent accidents, the hand lever in this design is coupled by way of a clutch to the shaft. This clutch is represented in FIG. 2 by a spring package 10 only, which presses the clutch discs together.

A toothed wheel 11 is located against the side of the locking disc 7 facing away from the seat divider 2 rigidly connected to the shaft 6, which meshes with a second toothed wheel 12 located below it. The second toothed wheel is fixed to a transfer shaft 13 which extends parallel to the rear cross strut 1 up to the next seat divider 14 and is rotatably attached there the same as at seat divider 2.

Figure 2:
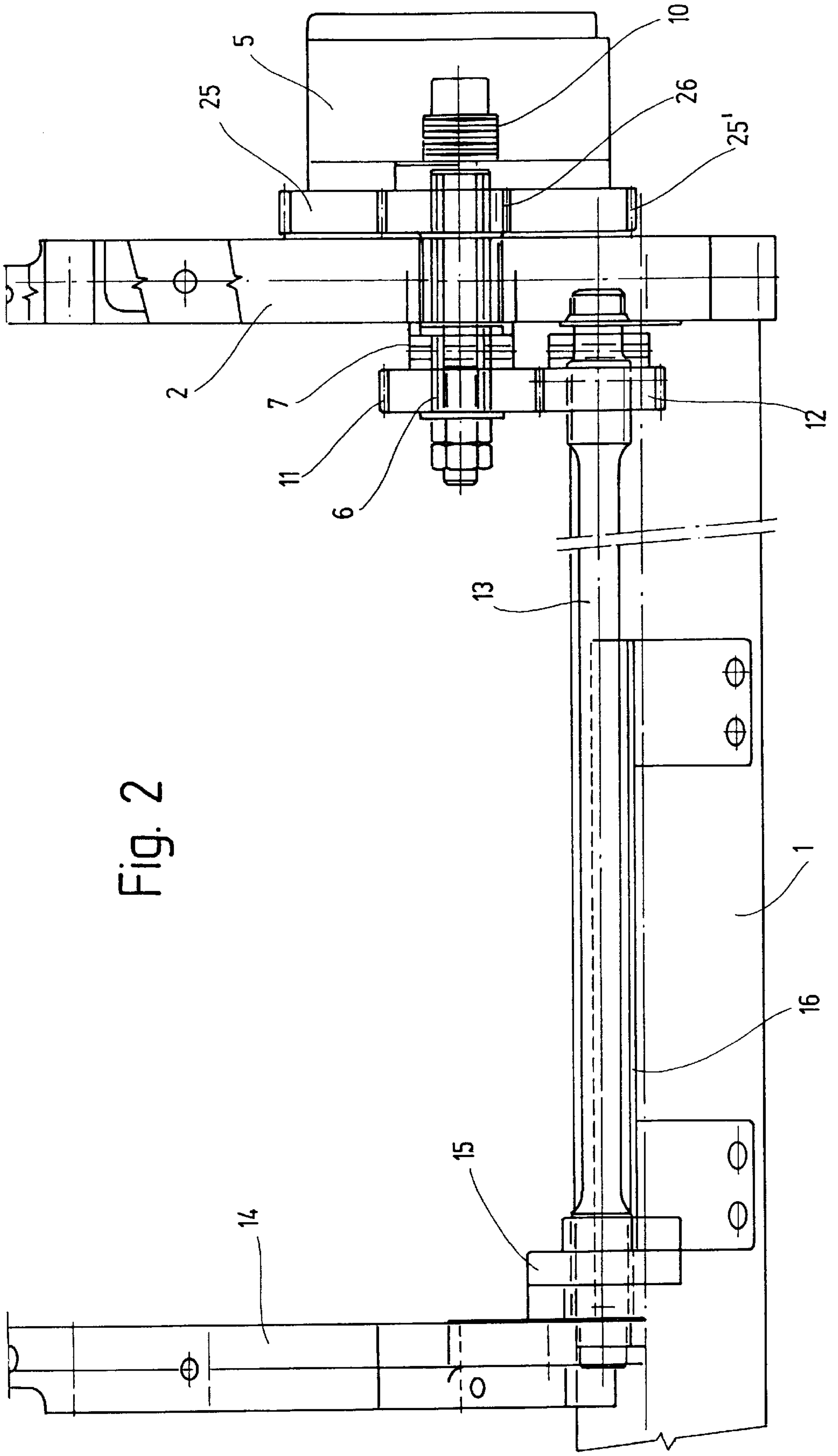
FIG. 2 is a partial plan view of the back side of the seat divider represented in FIG. 1, as well as of the other seat divider associated with the same seat without the associated paneling.

As shown in FIGS. 2 and 5, a latching disc 15 is fixed to the telescopically extendible transfer shaft 13 beside the seat divider 14. This disc has a cut-out 15' open to its outer surface and square in cross section. The latching disc 15, together with a rail 16 attached to the rear cross strut 1 and extending along it and square in cross section, forms a latching mechanism for the sections moveable along the cross struts. At minimal seating row width, the latch disc 15 rests against one end surface and at maximum width rests against the other end surface of the rail 16 and thus forms a snug connection of the displaceable sections to the rear cross strut 1. In contrast, at the center position of the hand lever 5, the cut-out 15' which matches the cross section of the rail 16 in form and size, is aligned with the rail 16. In this position, the latching disc 15 can then be moved along the rail 16 which is engaged with the cut-out 15' between the two end positions. A shoulder ledge, not represented, is provided along one flank of the cut-out 15' on one side of the latching disc 15 and along the other flank on the other side. These shoulders rest against the rail 16 when the hand lever 5 is tilted from one or the other end position to the center position. In this way, the cut-out 15' is aligned with the rail 16 on one hand and on the other, the hand lever 5 is prevented from tilting past the center position before the latching disc 15 is pushed along the rail 16 past its other end.

A tilt-lever 17 is provided as shown in FIG. 4 to actuate the locking stem 8 which forms the locking mechanism for the hand lever 5 together with the locking disc 7. This tilt-lever 17 is mounted on a vertical axis 18 tiltably in the seat divider 2 and located in a second depression 19 of paneling 3. To release the locking mechanism, the tilt-lever 17 must be moved against the force of a pretensioned spring, not shown, to a tilted position facing the outside of the seat divider 2 from a tilted position facing the inside of the seat divider 2. The tilt-lever 17 is constructed in one piece with a tilt arm 20 at approximately a right angle to it inside the seat divider 2, which is connected to the locking stem 8 by a linkage 21 or a cable line. A spring, not shown, pretensions the tilt-lever 17 in the direction of pushing the locking stem 8 into its latched position. The locking stem 8 then drops again into its locked position automatically after the cam 7' of the locking disc 7 has passed beneath it.

If, as in the described embodiment, not only the distance between the seats of the row can be changed, but a change-over from three seats of normal width to two seats of enlarged width and in reverse is possible, the individually tiltable seat backs must be brought to the same tilt angle before the latching of the seat back sections of the middle seat can be changed. In the present embodiment, all seat backs are maintained at the selected angle using pretensioned and lockable gas springs. In order to bring the seat backs all into the same position, all of these gas springs are simultaneously released, and all seat backs are adjusted to the steepest angle. This simultaneous release of all gas springs is accomplished with an actuation shaft 22, which runs parallel to the front cross strut and is rotatably mounted in the seat dividers 2 and 14. Radially extending actuators are provided which press against the control elements of the gas springs at corresponding rotation. The rotation of the actuating shaft 22 required for this is produced by the tilt-lever 17. A rod 23 protruding from the actuating shaft 22 in the radial direction is connected to the free end of the tilt arm 20 over a connecting linkage 24, as shown in FIG. 4.

Figure 3:
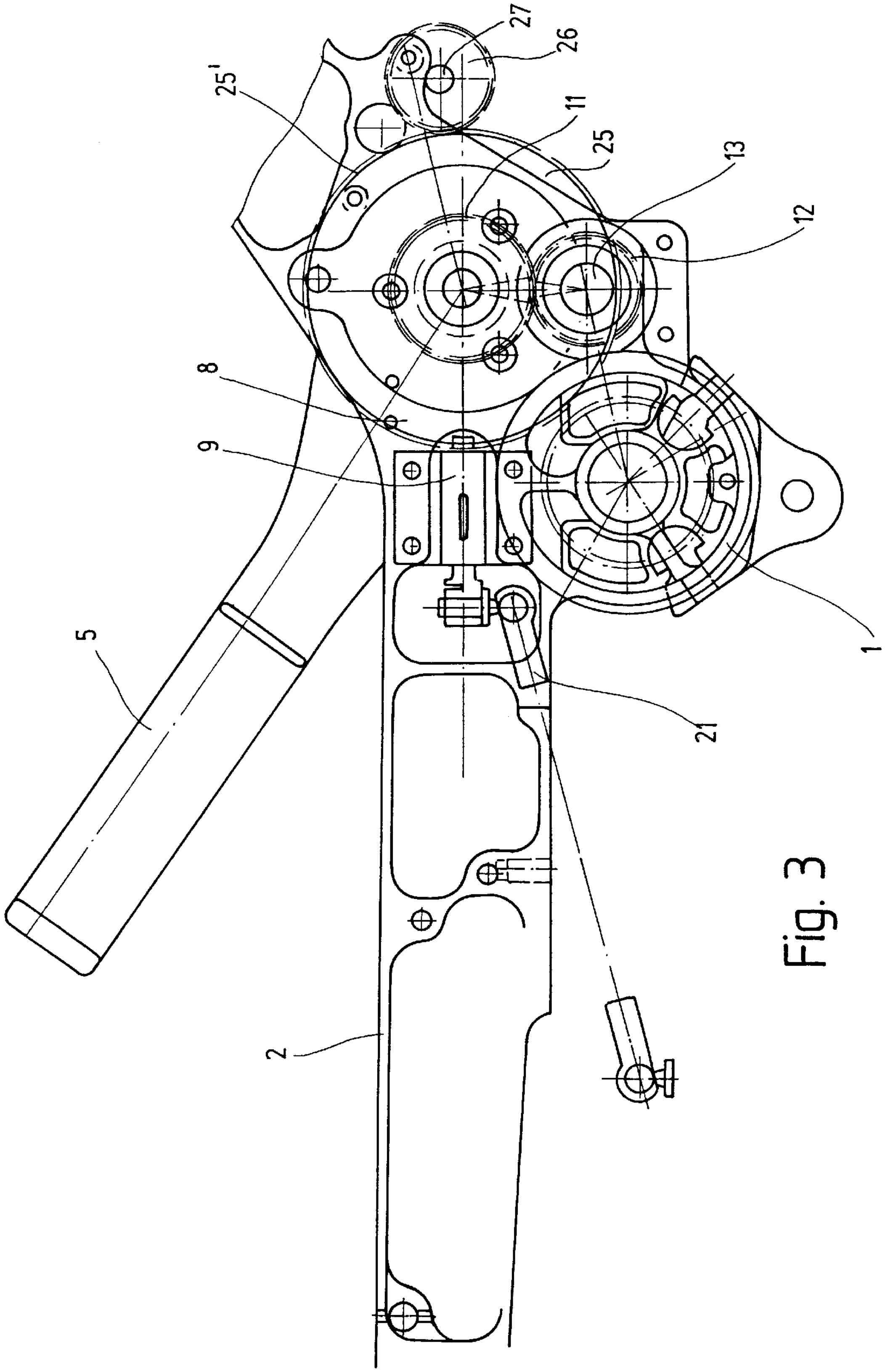
FIG. 3 is a partial view of the interior of the seat divider represented in FIG. 1, also without paneling.

The coupling elements, which connect the two side sections of the seat back of the middle seat to the center section or to the seat backs of the two outer seats as desired, form a mechanical coupling device which is actuated by the hand lever 5. For this purpose, a segmented tooth disc 25 is located on shaft 6 rigidly between the outside of the seat divider 2 and the inside of the hand lever 5. This segmented tooth disc 25, whose toothed rim 25' only extends over a portion of its perimeter is, as shown in FIG. 3, associated with a toothed wheel 26 which is attached to a telescoping connecting shaft 27. This connecting shaft 27 runs parallel to the rear cross strut 1 behind the segmented toothed disc 25 and extends to the driven coupling device above it, not shown. The toothed rim 25' meshes with the toothed wheel 26 only if an actuation of the coupling device is required. This is the case while tilting the hand lever 5 between the center position and an end position.

In order that the latter cannot be rotated if the toothed rim 25 is not meshed with the toothed wheel 26, and thus the coupling device cannot be actuated, an arresting device is provided which can take the form of a spring-loaded locking mechanism which cooperates with the toothed wheel 26. However, a detent cooperating with the teeth of the toothed wheel 26 would also work, for example, which is distanced from the segmented tooth disc 25. Further, the segmented toothed disc 25 could have a notch extending along its outer perimeter in the non-toothed region into which a positioning pin extending from the seat divider 2 engages, snugly limiting the tilting zone of the hand lever 5.

In order to make the non-latched state of the seating row visible, a lug 28 can be provided on the tilt-lever 17 as shown in FIG. 1, for example, which protrudes out of the second depression 19 only when the tilt-lever is located in the released position. The tab 28 has a noticeable color for this purpose, for example red. Understandably, another warning mechanism could also be provided, for example a knob which protrudes out of the outside of the covering 3 at the released position of the tilt-lever 17.

In this embodiment, the installation of the seating row for two widened seats is associated with the vertical position of the hand lever 5, for example for Business Class use, and the installation for three seats of normal width is associated with the horizontal position, for example for Economy Class use. Starting with the horizontal position of the hand lever 5, the tilt-lever 17 must first be tilted outward to its released position for a change-over of the seating row to two seats of enlarged width so that the locking stem 8 is pulled back. In addition, the gas springs are released by this tilting motion of the tilt lever 17 and the seat backs tilted to the steepest position. Moreover, the hand lever 5 can be tilted to the center position and the tilt lever 17 released since the locking stem 8 sits against the cam 7'. The hand lever 5 can then only be tilted to the center position since then one shoulder ledge of the latching disc 15 on the rail 16 prevents further movement. Moreover, the width of the seat row is brought to its minimum value at which the seat divider 2 is pushed against the other end of the seating row. In this way, the gap between the seat backs of the three seats is completely eliminated. During this displacement, the latching disc 15 moves along the rail 16 outward over its other end a small amount. The shoulder ledge of the latching disc 15 no longer rests against the rail 16 so that the hand lever 5 can be tilted to the vertical position. With this tilting motion, the latching disc 15 is tilted to the angle at which it rests against the front end of the rail 16 whereupon the sections moveable in the direction of the cross struts are again latched snugly to the rear cross strut 1. Also, in tilting the hand lever from the center to the vertical position the toothed rim 25' of the segmented tooth disc 25 is engaged with the toothed wheel 26 which actuates the coupling device through the connecting shaft 27. This releases the connection of the two side sections of the seat back of the middle seat to the center section and creates the connection to the seat backs of the two outside seats. As soon as the hand lever 5 reaches its vertical position, the cam 7' passes underneath the locking stem 8 so that it can again drop into place, and the tilt lever 17 automatically returns to its locked position and brings the lug 28 back to the original position.

If the seat row is to be changed over again to an installation with three seats of normal width, the tilt-lever must first be tilted outward again. The hand lever can then be tilted first to the center position and, after changing the width of the seat row, be tilted to the horizontal position.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A vehicle seating row having an adjustable frame for an adjustable row width and having particular application as an airplane passenger seating row, comprising:

a) a general seating framework for all seats which has a front cross strut and a rear cross strut parallel to said front cross strut, which are rigidly connected immovably relative to one another with pedestals, b) at least one seat having a frame portion which can be displaced in the direction of the cross struts relative to a neighboring seat between two positions in which the seat row has a maximum width and a minimum width and which can be locked in these positions to the framework by means of a latching mechanism, and c) a hand lever to work a locking device, said lever being capable of being moved in three different swing positions and being rotatably positioned on one of two terminal seat parts and, d) a manually releasable locking device for the hand lever, having a center position of the hand lever which is associated with the released state of the latching mechanism and a first tilted position associated with the effective state of the latching mechanism with an installation of the seat row in the minimal width, and a second tilted position associated with an installation of the seat row in the maximum width.

2. A vehicle seating row according to claim 1, wherein the hand lever is coupled by means of a toothed wheel gear to the latching mechanism.

3. A vehicle seating row according to claim 1, wherein the latching mechanism has a rail along the outside of one of the cross struts rigidly connected to it, and a latching disc which moves along said rail during change of the width of the seating row, wherein said disc can be moved by means of the hand lever between one position at which said disc rests against one front end of said rail, across a position at which a cut-out provided in the disc is aligned with the rail for movement along the rail, to a second position at which said disc rests against the other end of the rail.

4. A vehicle seating row according to claim 3, further comprising shoulders which rest against the rail is aligned with it.

5. A vehicle seating row according to claim 1, wherein when changing out three seats of normal width to two seats of enlarged width and vice versa, a coupling device is provided which connects two side sections of the seat back of the middle seat with one of the middle section or the seat backs of the two outer seats, and wherein the coupling device is connected to the hand lever through a second toothed wheel gear.

6. A vehicle seating row according to claim 5, wherein the second toothed wheel gear has a toothed wheel with a toothed rim extending only over a portion of the perimeter thereof, wherein this toothed rim is configured and located such that it remains unengaged with an associated toothed wheel in the center position of the hand lever.

7. A vehicle seating row according to claim 6, further comprising an arresting device for the toothed wheel associated with the toothed rim which secures it against rotation if the toothed rim is not engaged.

8. A vehicle seating row according to claim 7, further comprising an indicating element associated with the tilt lever which protrudes over the outside of the paneling only in the released position of the tilt-lever.

9. A vehicle seating row according to claim 5, further comprising an actuating device for simultaneous actuation of all releasing elements of gas springs which maintain the seat backs of both outer seats and the seat back sections of the center seat in chosen positions as well as a gear connection between this actuating device and the tilt-lever.

10. A vehicle seating row according to claim 1, wherein the locking device has a tilt-lever as an actuating member which is located in a depression on the outside of the paneling of the end seat divider and is mounted tiltably in said divider, a latch, movable by tilting the tilt-lever, and a locking disc cooperating with the tilt-lever which is attached rigidly to the drive shaft of the latching mechanism.

11. A vehicle seating row according to claim 10, wherein the locking disc has a cam wherein the latch rests against its two ends at an end position of the hand lever.

12. A vehicle seating row according to claim 10, wherein the tilt lever is spring-loaded to return to an initial position at which the latch takes a locked position.

* * * * *

UNITED STATES PATENT AND TRADEMARK OFFICE

CERTIFICATE OF CORRECTION

PATENT NO. : 5,810,290

DATED : September 22, 1998

INVENTOR(S) : Harald MERENSKY et al.

It is certified that error appears in the above-indentified patent and that said Letters Patent is hereby corrected as shown below:

In Col. 7, line 17, after "the rail" insert --when the cut-out--.

Signed and Sealed this

Ninth Day of March, 1999

Attest:

Q. TODD DICKINSON

*Attesting Officer*

*Acting Commissioner of Patents and Trademarks*